United States Patent [19]

Nakajima

[11] 4,412,576

[45] Nov. 1, 1983

[54] PNEUMATIC SNOW TIRE

[75] Inventor: Yukio Nakajima, Higashimurayama, Japan

[73] Assignee: Bridgestone Tire Company Limited, Tokyo, Japan

[21] Appl. No.: 389,799

[22] Filed: Jun. 18, 1982

[30] Foreign Application Priority Data

Jun. 29, 1981 [JP] Japan .............................. 56/101017

[51] Int. Cl.$^3$ ............................................. B60C 11/00
[52] U.S. Cl. ........................... 152/209 R; 152/209 D; 152/354 R; 152/361 R; D12/147
[58] Field of Search ........... 152/209 R, 209 D, 209 B, 152/209 WT, 209 NT, 330 R, 354 R, 355, 354 RB, 356 A, 356 R, 361 R, 361 FP, 361 DM; D12/146, 147

[56] References Cited

U.S. PATENT DOCUMENTS 3,512,567  5/1970  Verdier ........................... 152/209 R
3,875,986  4/1975  Boileau ........................... 152/209 R Primary Examiner—William A. Powell
Assistant Examiner—Thomas Bokan
Attorney, Agent, or Firm—Sughrue, Mion, Zinn, Macpeak and Seas

[57] ABSTRACT

A pneumatic snow tire for use in vehicles traveling on snow roads includes main circumferential grooves each consisting of circumferential groove components and bias groove components to form zigzag grooves whose zigzag amplitude in width directions of the tread is more than a width of the main circumferential grooves and bias grooves oblique to circumferential directions of the tire extending from connections of the circumferential and bias grooves components of the main circumferential grooves for connecting between the main circumferential grooves and between them and tread edges. With the tread pattern according to the invention, the tire scarcely clogs the grooves in the tread with snow and fully utilizes forces of snow columns at the tread surface without collapsing the snow caught in the grooves, thereby improving its driving and braking performances and achieving the prevention of noise in traveling.

7 Claims, 2 Drawing Figures

FIG_1

PNEUMATIC SNOW TIRE

BACKGROUND OF THE INVENTION

1. Field of the Invention:

This invention relates to a pneumatic snow tire having a tread superior in performance on snow covered roads and more particularly to an improvement of a radial tire for a snowmobile.

2. Description of the Prior Art:

The term "snow tire" used herein is intended to designate a tire to be used for vehicles such as snowmobiles traveling on snow roads.

Pneumatic tires for snowmobiles have been known, whose tread includes two or three circumferential zigzag grooves equally spaced apart from one another and a number of bias or transverse grooves extending from corners of the zigzag grooves and connecting between the zigzag grooves and between them and tread edges to form blocks divided by these grooves. In order to obtain driving and braking forces and a steering stability in traveling on snow roads, the tire for a snowmobile has a tread including circumferential zigzag grooves whose amplitudes in width directions of the tread are much larger than those of general tires, so that blocks formed between the zigzag and bias or transverse grooves include comparatively sharp corners extending at acute angles adjacent to retracting corners of the zigzag grooves.

It has been found in inventor's experiments on such conventional tires for snowmobiles that extending the corners of the circumferential zigzag grooves in the tread surfaces contacting a road during travel causes bending deformations of the tread and the deformable sharp corners of the blocks tend to collapse the snow (snow columns) caught in the grooves so that expected high shearing forces in the snow at the tread surface cannot be effectively utilized. Such disadvantages are enhanced by the depths of the grooves which are much deeper than those of general tires. Moreover, such conventional tires are apt to clog their grooves with snow or the like and produce high noise during travel.

SUMMARY OF THE INVENTION

It is an object of the invention to provide an improved snow tire which eliminates the disadvantages of the prior art.

It is another object of the invention to provide a snow tire which utilizes great shearing forces of snow columns without collapsing the snow caught in grooves in its tread and without clogging the grooves with snow, so that the tire is superior in driving and braking performances and steering stability and produces less noise in traveling.

In order that the invention may be more clearly understood, preferred embodiments will be described, by way of example, with reference to the accompanying drawings.

DETAILED DESCRIPTION OF THE PREFERRED EMBODIMENT

Figure 1:
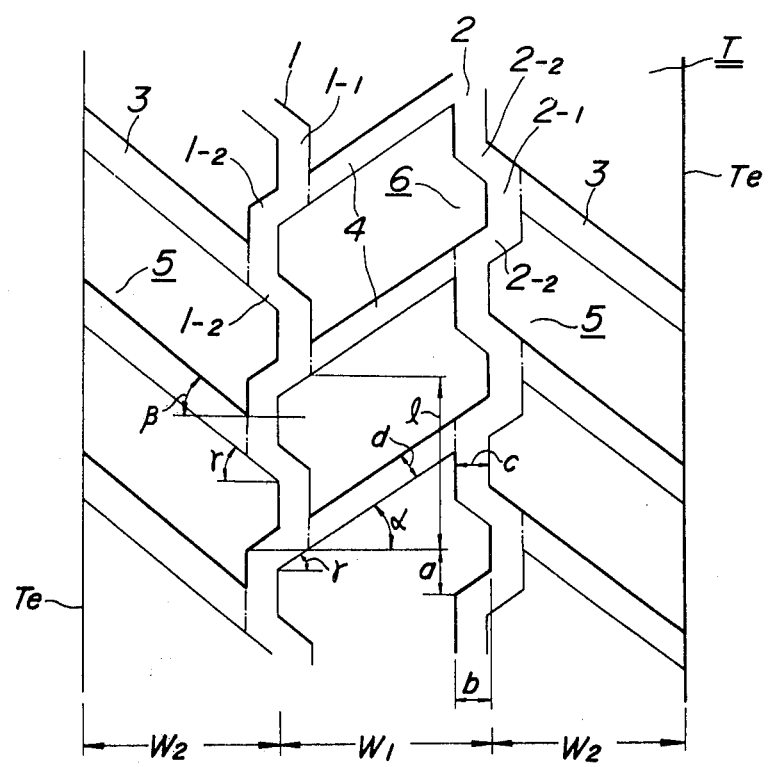
FIG. 1 is a development view of a tire tread of a preferred embodiment of the invention.

The tire according to the invention is applicable to both radial and bias tires, although the drawings do not illustrate entire tires. FIG. 1 shows a tread of a preferred embodiment of the tire according to the invention, which happens to be for a passenger car. A pair of sidewalls are contiguous to a toroidal tread between the sidewalls. Radially inward ends of the sidewalls form beads reinforced by respective bead wires embedded in the beads. A carcass extends over between the beads along the inside of the tire and a belt layer is arranged between the carcass and the tread to reinforce the tire.

The carcass consists of one or at the most three plies of layers of organic fiber cords, such as nylon, polyester and rayon, which are arranged in directions of meridians (radial directions) of the tire. The belt layer consists of two or three overlapped plies of steel or fiberglass cords which are bias within angles of 65°-80° to the directions of the meridians of the tire so as to intersect with the cords of the other plies. Inner and outer surfaces of the overlapped carcass and belt are coated with rubber layers. The tread of this tire particularly consists of a rubber layer much thicker than those of general tires.

Referring to FIG. 1, the tread T includes two circumferential grooves 1 and 2 which divide substantially equally the tread between both tread edges into zones $W_1$, $W_2$ and $W_2$. The circumferential grooves consist of circumferential groove components 1-1 and 2-1 parallel to the circumferential directions and bias groove components 1-2 and 2-2 oblique to the circumferential directions, these components forming the endless zigzag circumferential grooves in the tread. The zigzag grooves have an amplitude b in the width direction of the tread (the direction of the meridians). The amplitude b is more than the width c of the zigzag grooves (b>c).

In this embodiment, the circumferential grooves 1 and 2 are shifted to each other by a length a which is preferably in a relation $1/4 \leq a \leq 3l/4$, where l is a pitch of the circumferential grooves.

From every other connected portions of the circumferential groove components 1-1 and 2-1 and the bias groove components 1-2 and 2-2 of the circumferential grooves 1 and 2, bias grooves 3 and 4 extend through the zones $W_1$ and $W_2$ to define blocks 5 between the circumferential grooves 1 and 2 and the tread edges Te and blocks 6 between the circumferential grooves 1 and 2.

With this embodiment, both the outer bias grooves 3 and the center bias grooves 4 are in extension lines of the bias groove components 1-2 and 2-2 of the circumferential grooves, so that angles α of the center bias grooves 4 and angles β of the outer bias grooves 3 to the directions of the meridians are equal to angles γ of the bias groove components of the circumferential grooves to the directions of the meridians. These angles may be freely selected within 30°-60°.

Figure 2:
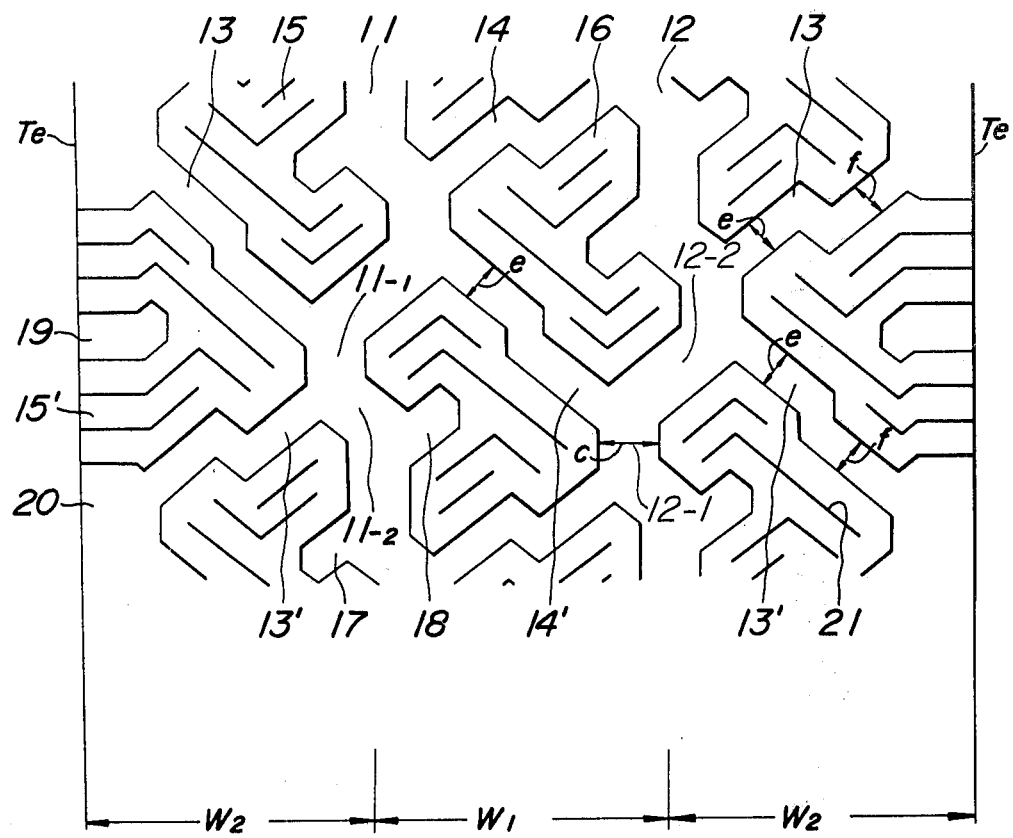
FIG. 2 is a development view of a tire tread of a second embodiment of the invention.

FIG. 2 illustrates another embodiment of the invention which is unique in the feature of bias grooves 13 and 13' and auxiliary grooves 17 in outer zones $W_2$ and bias grooves 14 and 14' and auxiliary grooves 18 in a center zone $W_1$, these grooves extending from connected corners of circumferential groove components 11-1 and 12-1 and bias groove components 11-2 and 12-2 of circumferential grooves 11 and 12. The bias grooves 13, 13', 14 and 14' are shifted or staggered in themselves at their centers in the form of a crank as shown in FIG. 2. The auxiliary grooves 17 and 18 are comparatively short bias grooves in the form of blind alleys. Blocks 15' adjacent to tread edges Te of the tire include respective transverse grooves 19 each extending in a direction of a meridian of the tire and having a blind end which is not communicated with any other groove and is somewhat bent in a circumferential direction of the tire. Comparatively wide space 20 are provided between the blocks 15'.

A width c of the circumferential grooves 11 and 12 is preferably wider than an average width of the bias grooves 13 and 13'. Outer halves of the bias grooves 13 and 13' on the sides of the tread edges in the outer zones $W_2$ may have a width f which is wider than a width e of the inner halves of the bias grooves 13 and 13' on the sides of the circumferential grooves or may enlarge in their width f progressively toward the tread edges.

The blocks 15, 15' and 16 formed by the grooves arranged in this manner may be properly provided with sipes or cuts, as required.

The tire according to the invention provides a comparatively wide groove space with the aid of the bias grooves branching from the connections of the components of the circumferential grooves and provides a great amplitude of the circumferential zigzag grooves in the width direction of the tire with the aid of the combination of the components of the circumferential grooves without any adverse effect on the rigidity of the blocks even if the lengths of the components of the circumferential grooves are short. Accordingly, the tire according to the invention can utilize the great shearing forces of snow columns without collapsing the snow caught in the grooves in the tread surface contacting snow roads. The tire according to the invention is therefore remarkably advantageous not only for driving and braking performances and stability in steering but also for the prevention of noise in traveling. Such significant effects of the tire according to the invention result of course from the fact that the tread of the tire includes the grooves formed to prevent clogging with snow and to utilize the great shearing forces without collapsing the snow columns caught in the grooves to improve the driving and braking performances and steering stability.

It is further understood by those skilled in the art that the foregoing description is that of preferred embodiments of the disclosed tires and that various changes and modifications may be made in the invention without departing from the spirit and scope thereof.

What is claimed is:

1. A pneumatic snow tire comprising: a pair of sidewalls and a tread extending therebetween, said tread having a pair of main circumferential grooves substantially equally dividing said tread along circumferential directions and bias grooves oblique to the circumferential directions connecting between said main circumferential grooves and between said main grooves and tread edges to form a number of blocks defined by said main and bias grooves, (a) said main circumferential grooves each consisting of circumferential grooves components substantially in parallel with the circumferential direction and bias groove components oblique to the circumferential direction alternately connected to form a staggered groove and being shifted relative to one another in the circumferential direction, wherein the shifted length (a) of said main circumferential grooves is in a relation of $0.25l \leq (a) \leq 0.75l$, where l is a pitch length of the main circumferential grooves, (b) an amplitude b of said main zigzag grooves in width directions of the tread and a width c of said main circumferential grooves being in a relation $b > c$, and (c) said bias groove extending from connections of said circumferential and bias groove components of said main circumferential grooves in directions of the bias groove component, and (d) a width of said circumferential groove being wider than an average width of said bias grooves.

2. A tire as set forth in claim 1, wherein angles of said bias groove components of the main circumferential grooves to meridians of the tire are within 30°–60°.

3. A tire as set forth in claim 1, wherein angles of said bias grooves to meridians of the tire are within 30°–60°.

4. A tire as set forth in claim 1, wherein the bias grooves extending between said main circumferential grooves and said tread edges increase in their widths in the proximity of the tread edges.

5. A tire as set forth in claim 1, wherein said bias grooves include auxiliary grooves which are comparatively short in the form of blind alleys.

6. A tire as set forth in claim 5, wherein said bias grooves other than said auxiliary grooves are staggered in themselves in the form of a crank.

7. A tire as set forth in claim 5 or 6, wherein said blocks adjacent to said tread edges of the tire include transverse grooves each extending in a direction of a meridian of the tire and having a blind end somewhat bent in the circumferential direction of the tire.

* * * * *